Figure 1:
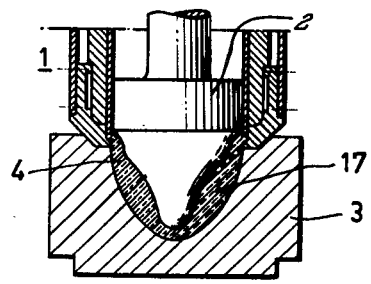

May 18, 1965 P. VAN ZONNEVELD 3,184,297
METHOD OF MECHANICALLY MANUFACTURING HOLLOW GLASS OBJECTS
Filed Jan. 30, 1961 4 Sheets-Sheet 1

INVENTOR
PIETER VAN ZONNEVELD
BY
AGENT

May 18, 1965 P. VAN ZONNEVELD 3,184,297
METHOD OF MECHANICALLY MANUFACTURING HOLLOW GLASS OBJECTS
Filed Jan. 30, 1961 4 Sheets-Sheet 2

INVENTOR
PIETER VAN ZONNEVELD
BY
*Frank R. Trifari*
AGENT

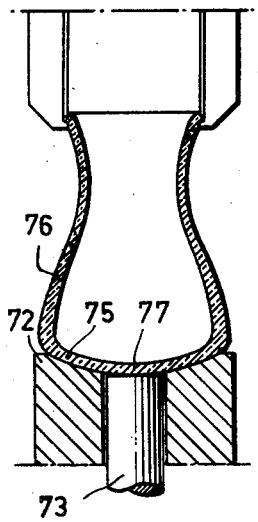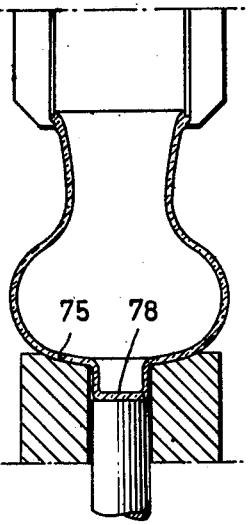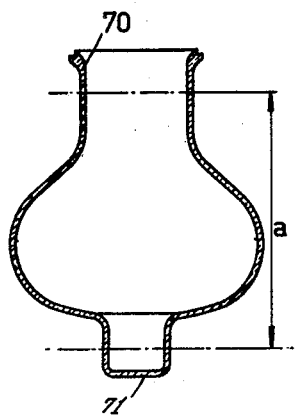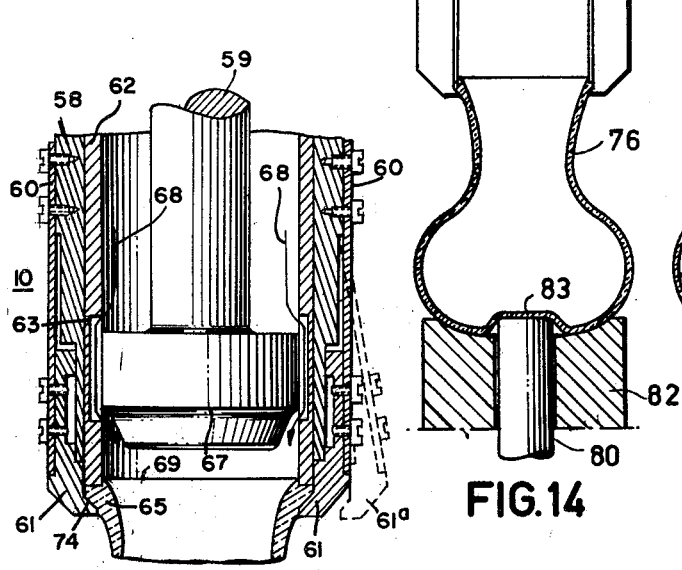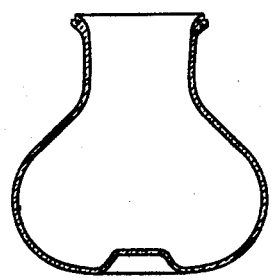

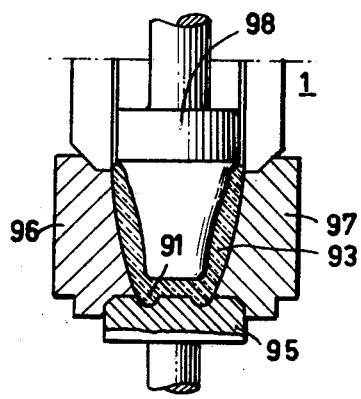
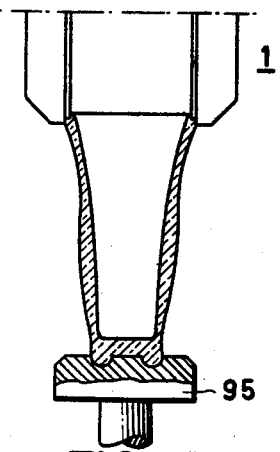
FIG. 16    FIG. 17
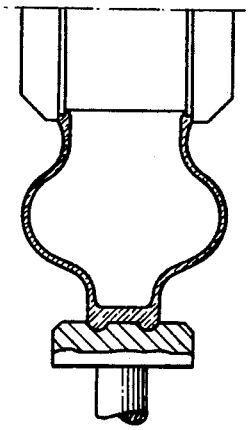
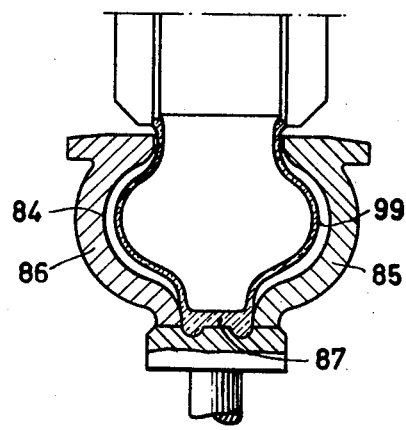
FIG. 18    FIG. 19

3,184,297
METHOD OF MECHANICALLY MANUFACTURING HOLLOW GLASS OBJECTS
Pieter van Zonneveld, Eindhoven, Netherlands, assignor to North American Philips Company, Inc., New York, N.Y., a corporation of Delaware
Filed Jan. 30, 1961, Ser. No. 85,597
Claims priority, application Netherlands, Feb. 12, 1960, 248,387
4 Claims. (Cl. 65—78)

This invention relates to a method of mechanically manufacturing hollow glass objects, for example, glass bulbs for electrical incandescent lamps.

In a known method a preformed glass portion, clamped at the top in a holder, is shaped into a parison, of which the lower end moves with respect to the holder during this formation from a higher level to a lower level, the parison being at the same time blown up to obtain a hollow glass object.

In this method the lower end of the parison sags gradually with respect to the holder. By supplying, during sagging, air and/or heat to the parison, the latter can be acted upon, in general, so that towards the end of the available period for sagging a parison is obtained of which the shape and the glass distribution are such that an object of the desired shape and glass distribution are obtained after blowing. In the case of a large number of kinds of objects the shape of the final object gives little rise to difficulties in the formation of the parison. This known method is suitable to form objects of which the shape is such that the ratio between the maximum size at its widened part and the size of the narrower part does not exceed a given value. However, if this ratio is chosen higher it is gradually more difficult in practice to act effectively, solely by air and/or heat supply during the sagging of the parison, upon the distribution of the glass mass in the parison so that at the end of the available period for sagging a parison is obtained of which the shape is such that after blowing the object of the desired shape and glass distribution can be obtained therefrom.

For each kind of hollow glass object there can be found a maximum ratio between the maximum size of the widened part and the size of the narrower neck part and if this ratio is exceeded it becomes practically no longer possible to carry out the known method. This maximum ratio, which also depends upon the length of the object, amounts for example for bulbs of electrical incandescent lamps, to about 1.8.

If yet an object in which the said maximum ratio is exceeded is to be manufactured by the known method, the results will sometimes leave much to be desired. The object may then, indeed, have the required shape, but at the maximum diameter the wall may be very thin, its thickness being mostly smaller than is required with respect to the locally desired mechanical rigidity. On the contrary, the wall thickness at the so-called bottom, i.e., at the place farthest remote from the neck opening, is too large. Such an undesirable ratio between the wall thickness is due to the fact that the suitable glass distribution already obtained in the glass portion gets lost for the major part during the sagging and blowing of the parison.

The present invention has for its object to provide measures by which the wall thickness in the parison can be favourably acted upon when the lower end of the parison moves from a higher level to a lower level.

The method according to the invention is characterized in that during the formation of the parison a part of the parison co-operates with a catching member movable in a vertical sense with respect to the parison and controlled so that the part of the parison co-operating with this catching member moves with a sense-reversing, vertical acceleration and, if necessary, with a sense-reversing, vertical speed, while heat may be supplied to the parison. By imparting this varying vertical acceleration to part of the parison during sagging it is possible to subject the parison a few times to a process in which the glass distribution of the parison is changed and adapted to the glass distribution desired at the instant concerned in sagging. In general, either during this process or after this process heat is to be supplied to change at the same time the shape of the parison. By carrying out the method according to the invention the glass mass can be displaced towards that part of the parison which is to have the largest size of the final hollow glass object, the place where the parison is in contact with the catching member owing to the aforesaid process, which has a bulging effect on the parison.

The part of the parison co-operating with the catching member may be the lower end of this parison, but as an alternative another part may be used to this end. This part may lie between the top end and the bottom end of the parison.

The use of a catching member is known per se in a method of mechanically manufacturing bottles. A movement-controlled catching member co-operates with the lower end of the sagging parison, but this lower end has, with respect to the remainder of the parison, such a large mass that, in the absence of a catching member, this end sags with an uncontrolled, excessive speed with respect to the holder in which the top end of the parison is clamped.

In accordance with the shape and the desired glass distribution of the final object to be manufactured in accordance with the invention the programme of the movements of parison and catching member may vary. It is a condition, however, that the vertical acceleration of the part of the parison co-operating with the catching member should repeatedly change its direction. Only then is it possible to effect a bulging action on the parison. An example of such a movement is that in which during the sagging of a parison, a vertically movable catching member exerts repeatedly a reverberating action on the lower end of the parison. The lower end of the parison thus moves not only with a repeatedly reversing vertical acceleration but also with a reversing vertical speed.

The invention provides furthermore an embodiment of the method described above in which the parison rotates about its longitudinal axis and the catching member performs a rotation about its vertical axis, the angular velocity of this movement corresponding in size and sense with that of the parison. The axes of rotation are in line with each other. This embodiment may be employed, for example, if the parison is to be exposed to heat produced by burners directed towards the parison.

The invention provides furthermore a device for carrying out the method described. This device, which comprises pre-forming members for a glass portion, a holder to clamp the top end of the pre-formed glass portion, a vertically movable catching member and, if necessary a blowing mould to blow the parison, is characterized in that the control-mechanism of the catching member is such that part of the parison co-operating with the catching member moves with a repeatedly reversing vertical acceleration and, if desired, with a reversing vertical speed, while, if desired, heat is supplied.

In a special embodiment the catching member is provided with a central, vertically slidable pin. This structure permits manufacturing objects of which the bottom has a proturberance or a re-entrant part.

By means of the method and the device according to the invention objects can be manufactured of which the diameter at the widest part is at least twice the smallest neck diameter. They may be used successfully, if the condition is to be fulfilled that the differences in wall thickness substantially throughout the object should be small. The invention may furthermore be employed to manufacture objects which have a thick bottom part as compared with the further part of the object.

The invention will now be described more fully with reference to the drawing, which shows a few embodiments.

FIGS. 1 to 7 relate to an embodiment in which a glass portion is preformed and subsequently shaped into a parison by co-operation with a catching member, this parison being finally blown up to obtain a hollow glass object.

Figure 8:
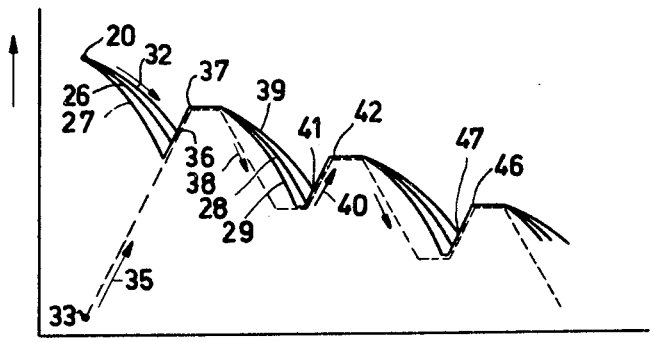
Figure 9:
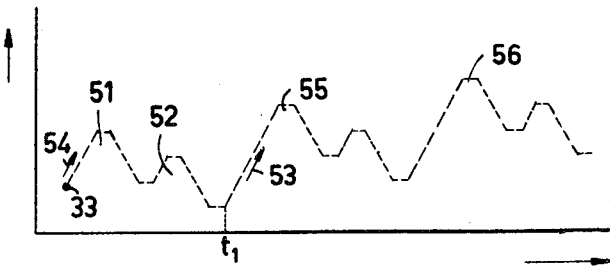

FIGS. 8 and 9 show displacement-time diagrams. In FIG. 8 it is indicated by full lines in what manner, for example, the part of the parison co-operating with the catching member moves from a higher level to a lower level with respect to the holder. The path covered by the catching member is indicated by broken lines. FIG. 9 shows a further example of a path which may be covered by the catching member.

FIG. 10 shows part of the holder to clamp the top end of a glass portion or parison.

FIGS. 11 and 12 relate to the formation of a parison, the catching member having a central pin movable independently of the catching member. The parison shown in FIG. 12 has a lower part protruding from the bulb-shaped portion. FIG. 13 shows the final object.

FIGS. 14 and 15 show one embodiment in which the catching member also comprises a movable, central pin. The parison shown in FIG. 14 has a sunken portion. The final object is shown in FIG. 15.

FIGS. 16 to 19 relate to one embodiment in which the final object has not only a thickened bottom portion but also a strongly widened, thin-walled bulb portion.

In the embodiment shown in FIGS. 1 to 7 for the mechanical manufacture of hollow glass objects by a combined pressing-blowing process, for example bulbs for electrical incandescent lamps provision is made of a holder 1 (see also FIG. 10) with a slidable templet 2, which co-operate with a preliminary form 3 in the arrangement shown in FIG. 1. When a glass portion is introduced into the preliminary mould 3, this portion can be deformed by lowering the templet 2 into a glass portion 4. When, after this preliminary formation, the mould 3 is removed from the holder 1, the templet 2 is moved upwards the glass portion clamped at the top in the holder 1 is allowed to sag to form a parison.

Figure 2:
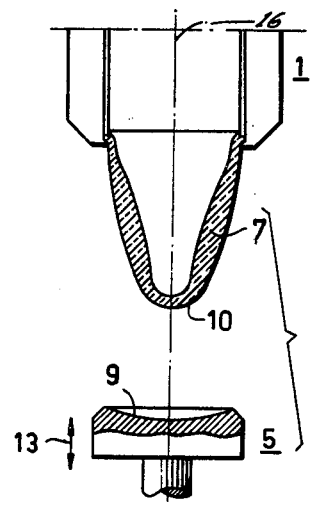
Figure 7:
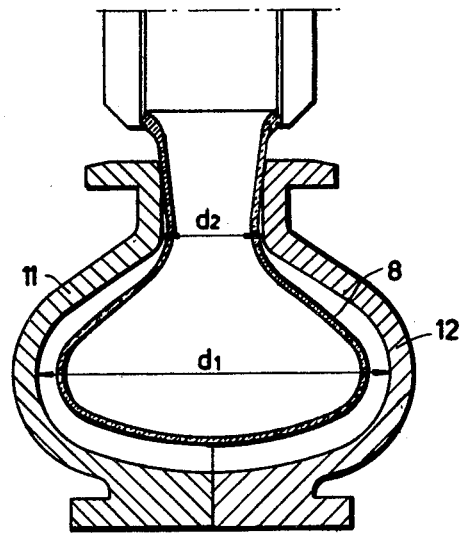

The glass portion 7, hanging in the holder in the way illustrated in FIG. 2, is to be moulded into a hollow glass object, of which the shape corresponds to the mould formed by the halves 11 and 12 (FIG. 7). The object is to have a maximum diameter $d_1$ and a minimum diameter $d_2$. In this embodiment the ratio between $d_1$ and $d_2$ is chosen to be 3½. A further condition is that the wall thickness of the final object should be uniform.

Already in the preminiary formation of the glass portion (FIG. 1) care is taken that a particular shape of this glass portion is obtained, which portion has a thickened part 17 as compared with the further part of the preformed portion. This part 17 is to be widened to a much larger diameter, when the parison is blown up into the final object. To this end the portion 7 (FIG. 2) is deformed by means of suitable parison formation so that the parison assumed the shape 8 in the blowing mould (FIG. 7). For this parison formation use is made of a movement-controlled catching member 5. In this embodiment the top side 9 of this member 5 has a shape which corresponds to the outer profile of the bottom part of the final object. The catching member is movable in a vertical sense (13) and is adapted to rotate about its centre line 16. After the preliminary formation and after the removal of the preliminary mould 3 from the holder 1, this holder is rotated about the vertical axis 16. The angular velocities of the holder 1 and of the catching member 5 in this embodiment correspond with each other in size and sense. The rotation of the holder with the clamped parison and of the catching member 5 is utilized in this case to permit supplying heat to the sagging parison by means of burners (not shown) directed towards the parison.

Figure 3:
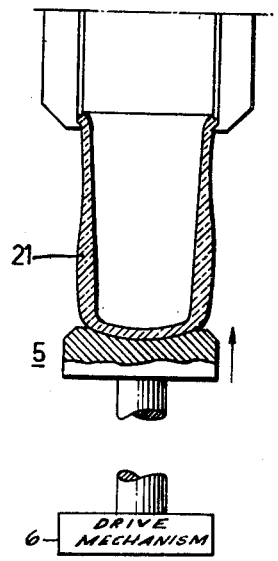
Figure 4:
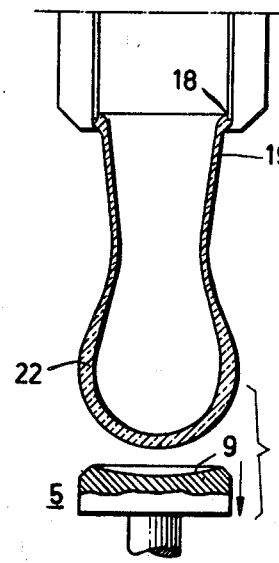
Figure 5:
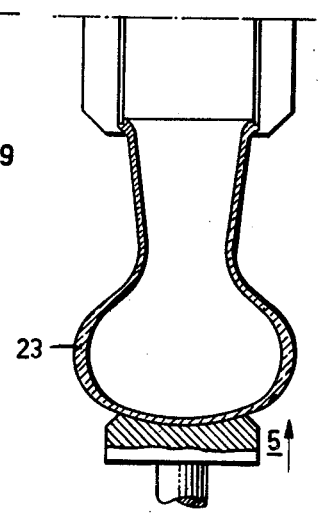
Figure 6:
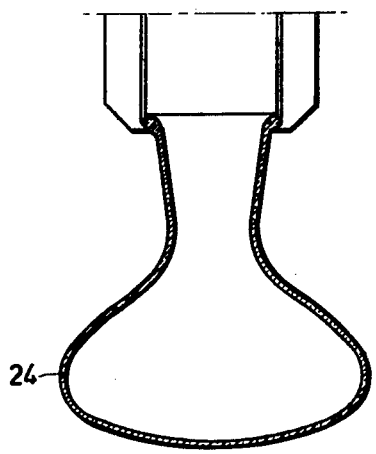

While the parison 7 moves from a higher level to a lower level, the lower end 10 of this parison can co-operate with the top side 9 of the catching member 5 in the manner illustrated in FIGS. 3 to 5. The drawing shows only three stages, but this number may, if desired, be increased.

The catch member 5 is moved by any suitable means 6 (hydraulic, pneumatic, or mechanical) in a series of reciprocations of different amplitude such as illustrated in the dash lines of FIG. 8 and described more fully in connection with said figure.

The co-operation between the lower end of the parison and the catching member will be described further with reference to a displacement-time diagram (FIG. 8). In this figure the time is plotted on the abscissa and the vertical displacement of the lower end of the parison with respect to the holder on the ordinate. In this figure the beginning of sagging of the parison is designated by 20. The lower end of the glass portion (FIG. 2) will sag in accordance with the curve 32, while heat and/or air is supplied. The catching member 5, of which the controlled movement is indicated in this figure diagrammatically by broken lines, performs away from 33 an upward movement 35. At 36 the top side of this catching member exerts an upward push on the parison so that the lower end of the parison also performs an upward movement and arrives at a higher level (37), where it is held for a short time. Thus the parison is subjected to a bulging action. By supplying a small amount of air to the interior of the parison, the latter will be blown up slightly, so that the widened shape of FIG. 3 is obtained. Then the catching member is rapidly moved downwards as indicated by 38. Thus the lower end of the parison can sag freely along the curve 39 with respect to the holder 1. However, this movement is interrupted by the upward movement of the catching member as indicated by 40. The place where the contact is established is designated by 41. Consequently, the lower end of the parison is again subjected to a bulging action so that the lower end arrives at a higher level 42. By supplying again air to the interior of the parison, the wider part of the parison of FIG. 5 can be obtained. This process may be repeated several times. It has been found that by this process the glass mass is displaced, where the parison is in contact with the catching member, in a direction of that part of the parison which has the maximum diameter $d_1$ in the final glass object. The part 17 of the portion 4 (FIG. 1) assumes a gradually larger diameter in the subsequent successive stages of the process and the thickness of this part 17 diminishes gradually (17, 7, 21, 22, 23, 24). The part 19 of the parison near the clamping place 18 (FIG. 4) is substantially not widened when air is supplied, since as soon as the parison starts sagging, this part has a smaller wall thickness. Consequently, the part 19 cools more strongly than the further parts of the parison, so that it becomes less readily deformable.

The lower end of the parison, which arrives from a higher level to a lower level with a repeatedly reversing acceleration, is set free several times from the catching member during the sagging process. It will be seen from the further description (FIGS. 16 to 19) that it is also possible to maintain the contact between the lower end of the parison and the catching member during sagging.

In the embodiment described the lower end of the parison contacts each time the top side 9 of the catching member 5, when the latter moves upwards (35, 40). In accordance with the shape of the final object this contact may be established at a different instant. From the point 20 of FIG. 8 onwards other curves 26, 27 and 28, 29 of the movement of the lower end of the parison with respect to the holder 1 may be chosen.

The successive supplies of small amounts of air to the interior of the parison to widen this parison at least partly, also termed puffing, occur in accordance with the foregoing when the lower end of the parison is held at a constant level for a short time (37, 42). In accordance with the final shape of the object the puffing instants may be chosen differently, i.e., sooner or later. It may even be desirable with a view to the desired degree of bulging to change the control of the catching member. This is illustrated in FIG. 9. The displacement-time diagram of this figure for the top side 9 of the catching member 5 initially has the same course (51, 52) as the diagram of FIG. 8; consequently, the lower end of the parison is similarly subjected to a few bulging actions exerted by the catching member. At the instant $t_1$ the catching member performs an upward movement 53 so that the lower end of the parison arrives at a greater distance from the starting point 33 than during the first upward movement 54. When the catching member arrives at the level 55, a longer or a more vigorous air supply will widen further the diameter of the parison. After the lower end of the parison has sagged further in a similar manner as at 51 and 52, the same process may be repeated at 56. Also in this embodiment the lower end of the parison moves with a repeatedly reversing acceleration and, as the case may be with a reversing speed.

FIG. 10 illustrates the structure of the holder 1 employed. The holder comprises a sleeve 58, in which a further sleeve 62 is arranged. In the sleeve 62 a templet 59 is adapted to move. Provision is furthermore made of a plurality of claws 61, connected with resilient strips 60 and forming together a closed ring in the "closed" position shown. In the "opened" position of these claws 61a this is not the case. The top end of the parison clamped in the holder is designated by 65. The sleeve 62 is furthermore provided with a plurality of axial recesses 63. In the position shown of the templet 59 air may be supplied in the direction of the arrow 68 to the lower side of the templet to transfer the air to the interior of a parison clamped in the holder. When the final object is obtained and the mould parts 11 and 12 are removed, the blown object can be removed by lowering the templet 59 in the sleeve 62. The part 67 of this templet exerts a pressure on the edge 69 of the object clamped in the holder. This pressure propagates through the material 65 of the object to the oblique edge 74 of the claws 61 forming the ring. Thus the claws 61 are urged aside into the position 61a against the spring action of the resilient strips 60. After an adequate displacement of these claws the object can be urged downwards out of the holder 1 by means of the templet 59. Since in the method described above hot glass is in contact with parts of the preliminary mould, of the catching member and of the blowing mould, the temperature of these parts should not rise considerably. This may be achieved by providing the parts with water cooling. Since water cooling is generally known, it will not be described further.

The part of the parison co-operating with the catching member need not always be the lower end thereof; this part may lie at a different place of the parison.

If, for example, the object shown in FIG. 13 is to be manufactured, from which, for example, by severing the parts 70 and 71, an object of a length $a$ open at both ends can be obtained, use may be made of a composite catching member as shown in FIG. 11. This catching member comprises an annular part 72, which can be governed in a vertical sense. A pin 73 is vertically movable in the centre of this member. This combined catching member may be employed as follows. In the manner described above such a bulging effect is exerted on the lower end of the parison, while the pin 73 occupies the position shown, that this parison assumes a slightly widened shape as is shown in FIG. 11. Then the pin 73 is moved so that it moves downwards with respect to the ring 72. When subsequently the ring 72 exerts successively a few upward shocks on the parison 76, the bottom part 77 of this parison can sag into the annular part 72. Then this bottom part will assume the shape designated in FIG. 12 by 78. It appears that in this manner objects as shown in FIG. 13 can be manufactured, which have a strongly widened, spherical part and a protuberance, while the wall thickness is very uniform.

In the embodiment shown in FIGS. 14 and 15 the pin 80 is also moved with respect to the annular catching member 82 after the parison has been provided with a slightly widened part as shown in FIG. 11. The direction of movement with respect to the annular catching member 82 is, however, reversed. As a result thereof the parison can be provided with a sunken part 83. The final object (FIG. 15), as well as the object shown in FIG. 13, is manufactured by arranging blowing mould parts around the parison after the last bulging action.

In the embodiment shown in FIGS. 16 to 19 for the manufacture of a hollow glass object of which the widened part corresponds to the shape of the mould cavity 84 and the bottom part is to be shaped in the form 87, a bottom part 91 and a part with a partly thickened, upright side wall 93 are formed already during the preliminary formation of the glass portion. The shape of the bottom part 91 is such that it corresponds substantially with the shape of the bottom 87 of the final object. The catching member 95 forms part of the preliminary mould with the parts 96 and 97 and of the blowing mould with the parts 85 and 86. After the glass portion has been preshaped as is shown in FIG. 16 and the templet 98 has been moved upwards and the preliminary mould parts 96, 97 have been removed, this glass portion, clamped at its top in the holder 1, can arrive from a higher level at a lower level, while, if desired, heat is supplied, when the catching member 95 performs a downward movement. During this downward movement the parison remains at its lower end constantly in contact with the top side of the catching member. Thus during sagging at least the outer shape of the bottom part is prevented from being deformed. By imparting to the catching member in the manner described above a repeatedly sense-reversing acceleration and, if necessary, a sense-reversing vertical speed and by introducing air into the parison in the intervals, the parison will also in this embodiment have finally a strongly widened part (FIG. 18). Of the various stages between the preliminary formation of the glass portion (FIG. 16) and the blowing of the parison 99 in the blowing mould, only two stages (FIGS. 17, 18) are shown in the drawing. Thus cup-shaped objects can be manufactured, in which at least at the widest part of the object the wall thickness is comparatively small and the bottom part has a comparatively strong wall thickness.

What is claimed is:

1. A method of manufacturing hollow glass objects comprising the steps, engaging one end of a pre-shaped glass body, supporting said body while elongating the other end by subsidence to form a parison, contacting sequentially the other end of said parison in a direction opposite the direction of subsidence and of different amplitudes to change the glass distribution in the parison, and puffing the parison into a hollow glass object having a substantially uniform wall thickness.

2. A method of manufacturing hollow glass objects comprising the steps, engaging one end of a pre-shaped glass body, supporting said body while elongating the other end by subsidence to form a parison, contacting said other end of the parison with sequential upward vertical movements of different amplitudes to change the glass distribution in the parison, and puffing the parison into a hollow glass object having a substantially uniform wall thickness and blow moulding said object into a finished shape.

3. A method of manufacturing hollow glass objects comprising the steps, engaging one end of a pre-shaped glass body, supporting said body while elongating the other end by subsidence to form a parison, rotating and heating the parison while it is being formed, contacting the subsiding end of the parison with sequential upward vertical movements of different amplitudes to change the glass distribution in the parison, and puffing the parison into a hollow glass object.

4. A method of manufacturing hollow glass objects comprising the steps, engaging one end of a pre-shaped glass body, supporting said body while elongating the other end by subsidence to form a parison, rotating said parison at a given angular velocity and heating the parison, contacting the subsiding end of the parison with sequential upward vertical movements of different amplitudes to change the glass distribution in the parison, said upward vertical movements being carried out during rotation of said parison at said given angular velocity, and puffing the parison into a hollow glass object having a substantially uniform wall thickness and blow moulding said object into a finished shape.

References Cited by the Examiner

UNITED STATES PATENTS

| | | | |
|---|---|---|---|
| 566,469 | 8/96 | Proeger | 65—261 |
| 703,618 | 7/02 | Sievert | 65—63 |
| 763,849 | 6/04 | Bryce | 65—242 |
| 1,061,405 | 5/13 | Rau | 65—80 |
| 1,527,947 | 2/25 | Wood | 65—79 |
| 1,618,747 | 2/27 | Bartlett | 65—80 |
| 1,888,393 | 11/32 | Roirant | 65—82 |
| 1,972,717 | 9/34 | Schutz | 65—261 X |
| 1,992,951 | 3/35 | Howard | 65—75 |
| 2,030,328 | 2/36 | Schutz | 65—212 |
| 2,075,771 | 3/37 | Soubier | 65—263 X |
| 2,091,238 | 8/37 | Gordon | 65—79 |
| 2,102,357 | 12/37 | Dichter | 65—242 X |
| 2,349,177 | 5/44 | Kopitke | 264—96 |
| 2,593,771 | 4/52 | Laidig | 65—229 |
| 2,693,667 | 11/54 | McLaughlin | 65—64 |
| 2,951,264 | 9/60 | Bailey | 65—261 X |
| 2,975,554 | 3/61 | Stutske et al. | 65—70 |
| 2,978,839 | 4/61 | Eastus et al. | 65—166 |

FOREIGN PATENTS

| | | |
|---|---|---|
| 806,761 | 12/58 | Great Britain. |
| 411,170 | 3/25 | Germany. |

DONALL H. SYLVESTER, *Primary Examiner.*

ARTHUR P. KENT, *Examiner.*